US012615251B2

(12) United States Patent
Mehta et al.

(10) Patent No.: US 12,615,251 B2
(45) Date of Patent: Apr. 28, 2026

(54) TRANSFORMED ONE TIME PASSWORD (OTP) FOR AUTHENTICATION

(71) Applicant: Dell Products L.P., Round Rock, TX (US)

(72) Inventors: Viral Kirtikumar Mehta, Pune (IN); Abhidnya Sushant Joshi, Pune (IN); Sampada Patil, Pune (IN)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 18/670,086

(22) Filed: May 21, 2024

(65) Prior Publication Data

US 2025/0365279 A1      Nov. 27, 2025

(51) Int. Cl.
*H04L 9/40*        (2022.01)
*H04L 9/08*        (2006.01)

(52) U.S. Cl.
CPC ........ *H04L 63/0838* (2013.01); *H04L 9/0863* (2013.01)

(58) Field of Classification Search
CPC ..... H04L 63/0838; H04L 9/0863; H04L 9/40; H04L 9/08
See application file for complete search history.

(56) References Cited

U.S. PATENT DOCUMENTS 7,904,946 B1 *   3/2011   Chu .................... H04W 12/068
                                                            726/8
10,102,356 B1    10/2018   Sahin et al.

2007/0250920 A1 *  10/2007  Lindsay .................. G06F 21/31
                                                            726/7
2016/0080366 A1 *   3/2016  Agarwal ............. H04L 63/0838
                                                            726/6
2022/0188400 A1 *   6/2022  Nassar .................... G06F 21/46
2022/0232002 A1 *   7/2022  Gajre ................. H04L 63/0838
2023/0134511 A1 *   5/2023  Matos ................. H04L 63/0838
                                                            726/6

FOREIGN PATENT DOCUMENTS

CN            102804200 A  * 11/2012  ........... H04L 9/3228

OTHER PUBLICATIONS

Wikipedia, "Google Authenticator," 4 pages, retrieved May 2, 2024, available at https://en.wikipedia.org/wiki/Google_Authenticator.
Business Today, "Is your OTP safe? Here is how hackersare redirecting your SMS." 6 pages, retrieved May 2, 2024, available at https://www.businesstoday.in/latest/trends/story/is-your-otp-safe-here-is-how-hackers-are-redirecting-your-sms-290921-2021-03-16.

* cited by examiner

*Primary Examiner* — Jayesh M Jhaveri
(74) *Attorney, Agent, or Firm* — Fogarty LLP

(57)                ABSTRACT

A password-protected device may support transformed passwords. In one example, a one-time password (OTP) may have a time-limited validity. The transform may be known to a user, and the transform may include manipulating characters in the OTP, such as by transposing characters, incrementing characters, or the like. The user may enter a transformed password to the system, and the system may reverse the transform and then compare the OTP to a reference OTP. The transform may provide an extra level of security over and above that provided by passwords themselves.

20 Claims, 4 Drawing Sheets

100

102

PASSWORD PROTECTED DEVICE

106
PROCESSOR

108
MEMORY DEVICE

110
NETWORK INTERFACE

112
SECURITY APPLICATION

114
GUI 103-1
USER COMPUTING DEVICE

• • •

103-M
USER COMPUTING DEVICE

104
NETWORK

120
IDENTITY PROVIDER SERVER

130
USER MOBILE DEVICE WITH SECURITY APPLICATION

200

300

400

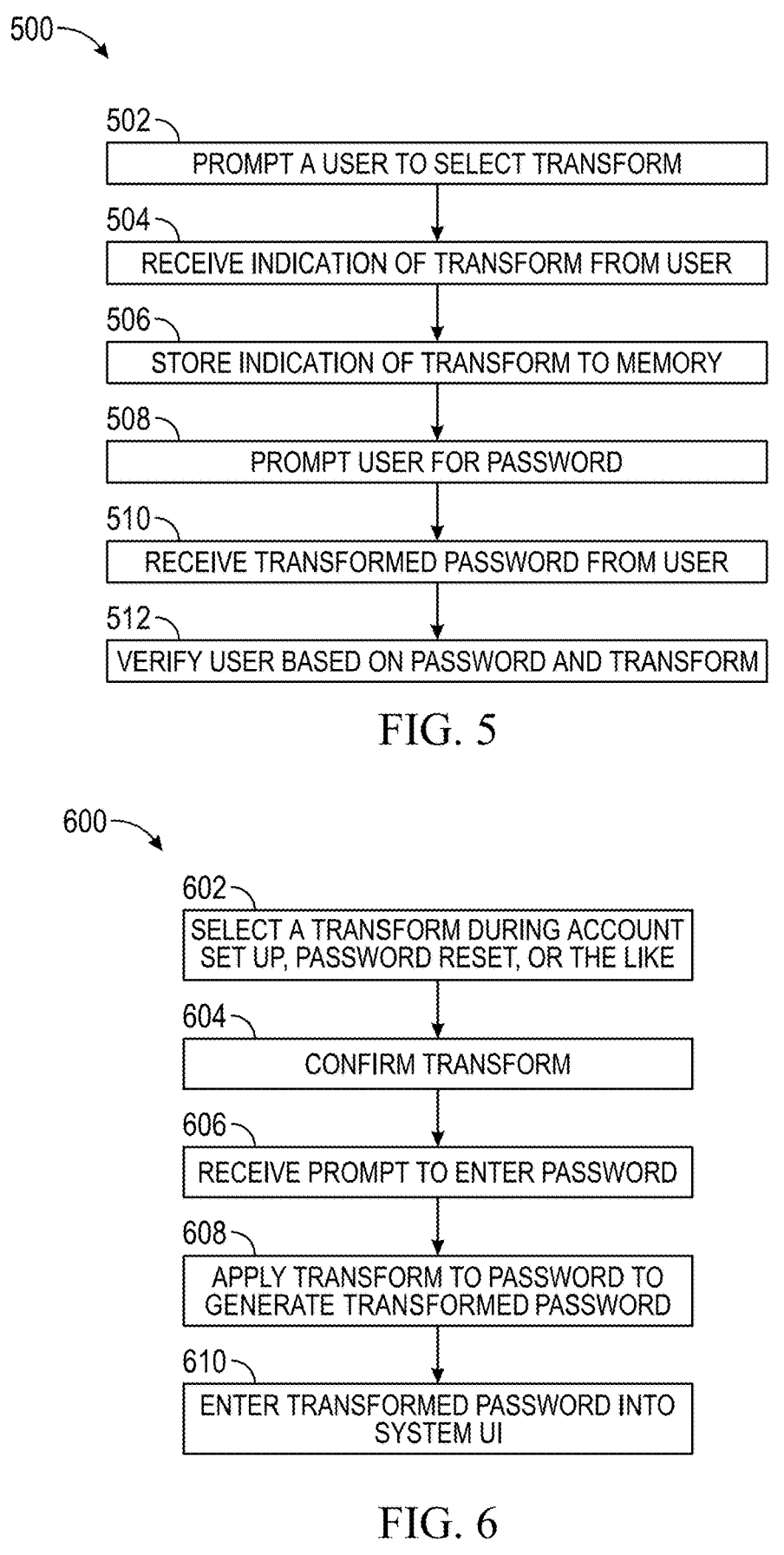

500 ⌐

502 ⌐
PROMPT A USER TO SELECT TRANSFORM

504 ⌐
RECEIVE INDICATION OF TRANSFORM FROM USER

506 ⌐
STORE INDICATION OF TRANSFORM TO MEMORY

508 ⌐
PROMPT USER FOR PASSWORD

510 ⌐
RECEIVE TRANSFORMED PASSWORD FROM USER

512 ⌐
VERIFY USER BASED ON PASSWORD AND TRANSFORM

602 ⌐
SELECT A TRANSFORM DURING ACCOUNT SET UP, PASSWORD RESET, OR THE LIKE

604 ⌐
CONFIRM TRANSFORM

606 ⌐
RECEIVE PROMPT TO ENTER PASSWORD

608 ⌐
APPLY TRANSFORM TO PASSWORD TO GENERATE TRANSFORMED PASSWORD

610 ⌐
ENTER TRANSFORMED PASSWORD INTO SYSTEM UI

FIG. 6

TRANSFORMED ONE TIME PASSWORD (OTP) FOR AUTHENTICATION

FIELD

The present disclosure relates generally to Information Handling Systems (IHSs) and relates more particularly to systems and methods for providing account access by users using a transformed password.

BACKGROUND

Computing devices are typically configured to incorporate security functionality to protect such devices from unauthorized and/or malicious activity. For example, it may be desirable to prevent suspicious computer operations, such as those implemented by an illegitimate and/or unauthorized user. The availability of such security functionality, as well as the threats faced by such security functionality, can change over time.

A need exists for a more dynamic approach to protecting computing devices.

SUMMARY

In one example embodiment, a method includes providing a user interface (UI), the UI including a prompt for a user to enter a one-time password (OTP); receiving the OTP via a user input to the UI, wherein the OTP comprises a quantity of alphanumeric characters; performing a first transform on the OTP, thereby generating a transformed OTP; comparing the transformed OTP to a reference OTP; and either verifying the user or not verifying the user based on results of the comparing.

In another example embodiment, an Information Handling System (IHS) includes: a processor; and a memory coupled to the processor, the memory having program instructions stored thereon that, upon execution by the processor, cause the processor to: provide a user interface (UI), the UI including a prompt for a user to enter a one-time password (OTP); receive the OTP via a user input to the UI, wherein the OTP comprises a quantity of alphanumeric characters; perform a first transform on a reference OTP, thereby generating a transformed reference OTP; compare the transformed reference OTP to the OTP; and either verify the user or not verify the user based on results of the comparing.

In yet another example embodiment, a computer-readable, non-transitory memory device having program instructions stored thereon that, upon execution by a processor of an Information Handling System (IHS), causes the processor to: prompt a user to indicate a first transform, selected from a plurality of transforms, for use with account verification; store, in memory, an indication of the first transform; prompt the user to enter a password; receive the password; access, from the memory, the indication of the first transform; determine that the user has entered the password according to the first transform; and permit the user to access the IHS.

BRIEF DESCRIPTION OF THE DRAWINGS

The present disclosure is illustrated by way of example and is not limited by the accompanying figures. Elements in the figures are illustrated for simplicity and clarity and have not necessarily been drawn to scale.

FIG. 5 is an illustration of an example method, which may be performed by a system to facilitate and support the use of transformed passwords, according to various embodiments.

FIG. 6 is an illustration of an example method, which may be performed by a user to set up and use a transformed password, according to various embodiments.

DETAILED DESCRIPTION

Figure 1:
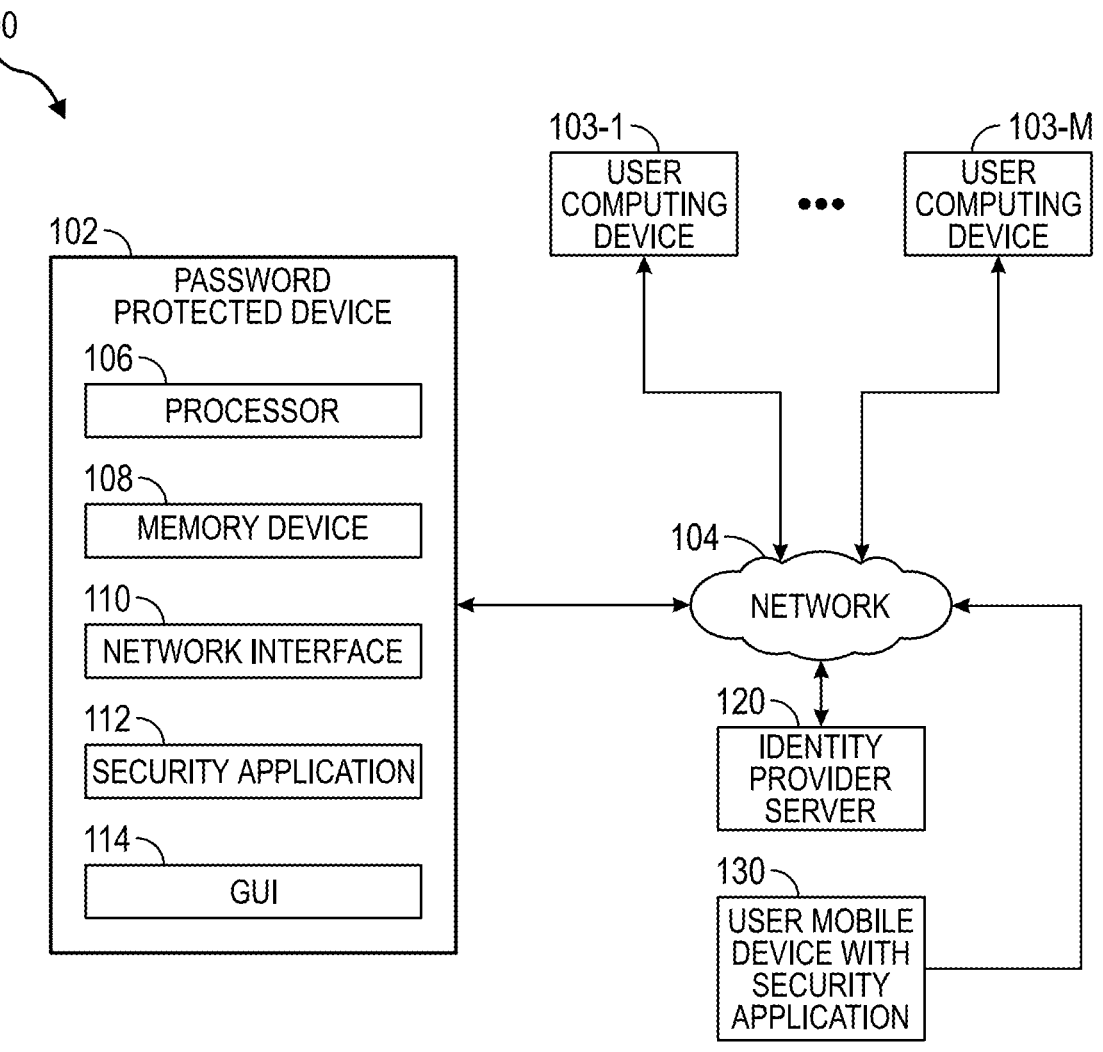
FIG. 1 is an illustration of an example system supporting transformed passwords, according to various embodiments.

Various embodiments may provide security to computer resources by allowing for transformed passwords. In one example, a user may be prompted to choose a transform from a multitude of transform choices. Examples of transforms include cyclic right shift, cyclic left shift, reverse order, transposition of characters, and the like. The user may choose the transform, confirm the transform, and then save the changes to the user account.

During use, the user may begin a login operation to be verified to use the user account of the computer resource. For instance, the user may enter a primary password and, assuming the primary password is entered correctly, the user may then be presented with a prompt to enter a one time password (OTP). The prompt may appear on a graphical user interface (GUI) provided by the computing resource. Further in this example, the particular computer resource may have integrated an authenticator application, and the user may also have a corresponding authenticator application on a computing device that is separate from the computer resource. For instance, the computer resource may include a Web server that hosts a webpage, whereas the user device may include a smart phone. The user may open the authentication application on the user device and be presented with an OTP. For instance, the OTP may include an alphanumeric text string, such as six digits.

Continuing with the example, the user may transform the OTP to generate a transformed OTP and then enter the transformed OTP at the prompt. In one example, the transform is a cyclic right shift, and the user performs a cyclic right shift on the alphanumeric text string and then enters the transformed text string at the prompt. In other words, instead of entering the OTP as it is given by the authentication application, the user may then enter a transformed version of the OTP into the GUI at the computing resource.

The computing resource may receive the transformed OTP and then perform a reverse transform on the transformed OTP. For instance, if the transform used by the user is a cyclic right shift, then the reverse may include a cyclic left shift. Once the computing resource has applied the reverse transform, the computing resource has possession of the OTP. The computing resource may then move forward with user verification, as appropriate. In one example, the computing resource is configured to generate the same OTP using a shared secret key. The computing resource may then compare the OTP from the user to its own generated OTP. If the OTPs correspond, then the computing resource may grant access. On the other hand, if the OTPs do not correspond, then the computing resource may deny access. In another example, instead of applying the reverse transform to the transformed OTP (from the user), the computing system may transform its own generated OTP and compare that result to the transformed OTP.

In yet another example, the computing resource relies on an authentication service to verify the OTP. For instance, a single sign-on (SSO) service may verify users and return a token to the computing resource that indicates that a user has been verified. In such an instance, the SSO service may include its own multi-factor authentication (MFA) that verifies the OTP. Continuing with the example, the computing resource may receive the transformed OTP from the user, perform the reverse transform to generate the OTP, and then transmit the OTP to the SSO service. The SSO service may compare the OTP (received from the computing resource) to its own generated OTP and either allow access or deny access based on the comparing.

Any of the various embodiments may also be configured to transform a primary password instead of or in addition to transforming a secondary password. For instance, in the example above, the OTP is used as a secondary password. However, various embodiments may instead use a transform for a primary password or may use one or more transforms on both the primary password and the secondary password.

Various embodiments may provide advantages over other solutions. For instance, it is becoming more common that multifactor authentication may be compromised for some users. The transform, which is chosen by the user and kept secret by the computing resource, may add an extra layer of security for the user account. For instance, even if a malicious user gained access to the OTP, it is doubtful that the malicious user would also be aware of the transform. Furthermore, in an example in which the OTP is time-limited, e.g., 30 seconds, it may not be feasible for a malicious user to attempt different possible transforms to gain access. Additionally, some computing resources may lock an account after a set quantity of unsuccessful login attempts, thereby providing further defense against an attacker who may have to guess the transform. In other words, various embodiments may increase security of computer systems by conditioning verification on an additional piece of user knowledge (the chosen transform), where that piece of user knowledge may be difficult to guess or determine by brute force.

FIG. 1 illustrates an example computer arrangement (also referred to herein as an arrangement of information processing systems) 100 configured to protect devices using password transformation, in accordance with illustrative embodiments.

The password-protected device 102 includes a processor 106, which may be any appropriate type of processor, such as a multi-core central processing unit (CPU), a reduced instruction set computer (RISC), and/or the like. Password-protected device 102 also includes a memory device 108, which may include volatile and nonvolatile memory. In one example, the memory device 108 includes non-volatile memory, which stores computer-readable code, which may be executed by the processor 106. The computer-readable code may include computer instructions that provide the functionality of an operating system. The computer-readable code may also include computer instructions that provide the functionality of one or more applications, such as security application 104 that provides for transformed passwords. The memory device 108 may also include volatile memory, which may be used as system memory during runtime.

The password-protected device 102 also includes network interface 110, which allows the password-protected device 102 to send and receive packets over the network 104. GUI 114 may be associated with the security application 112 and may allow the user to select a password transform, may prompt a user for primary and/or secondary passwords, and may receive user input.

The computer arrangement 100 includes a plurality of user computing devices 103-1 through 103-M, collectively referred to herein as user computing devices 103. The user computing devices 103 are coupled to a network 104, where the network 104 in this embodiment may represent a sub-network or other related portion of a larger computer network. Also coupled to network 104 identity provider server 120 and user mobile device 130, discussed below. The user computing devices 103, the identity provider server 120, and the user mobile device 130 may be implemented to include respective processors, memory devices, network interfaces, operating systems, applications, and the like.

The password-protected device 102 and/or user computing devices 103 may include, for example, host devices, storage appliances and/or devices such as mobile telephones, laptop computers, tablet computers, desktop computers or other types of computing devices. Additionally, the user mobile device 130 may include a smart phone, a tablet device, or other mobile device configured to interface with network 104. Such devices are examples of what are more generally referred to herein as "processing devices." Some of these processing devices are also generally referred to herein as "computers." The password-protected device 102 and/or user computing devices 103 may include a network client that includes networking capabilities such as ethernet, Wi-Fi, etc. When the password-protected device 102 and/or user computing devices 103 are implemented as host devices, the host devices may illustratively include servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user computing devices 103 in some embodiments may be associated with a particular company, organization or other enterprise or group of users. In addition, at least portions of the computer arrangement 100 may also be referred to herein as collectively comprising an "enterprise network." Numerous other operating scenarios involving a wide variety of different types and arrangements of processing devices and networks are possible, as will be appreciated by those skilled in the art.

The identity provider server 120 may be implemented, for example, on the cloud, such as a private cloud, or on the premises of an enterprise or another entity. In some embodiments, the identity provider server 120, or portions thereof, may be implemented as part of a host device.

The password-protected device 102, user computing devices 103, and/or identity provider servers 120 may be implemented on a common processing platform, or on separate processing platforms. The managed hardware devices 102 and/or user computing devices 103 may be configured to interact over the network 104 in at least some embodiments with the identity provider server 120. Each of the password-protected device 102, user computing devices 103, and/or identity provider servers 120 may be an information handling system (IHS).

The term "processing platform" as used herein may encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location.

The network 104 may include a portion of a global computer network such as the Internet, although other types of networks may be part of the computer arrangement 100, including a wide area network (WAN), a local area network (LAN), a satellite network, a telephone or cable network, a cellular network, a wireless network such as a Wi-Fi or WiMAX network, or various portions or combinations of these and other types of networks. The computer arrangement 100 in some embodiments therefore includes combinations of multiple different types of networks, each including processing devices configured to communicate using internet protocol (IP) or other related communication protocols.

Also associated with the password-protected device 102, user computing devices 103, user mobile device 130, and/or identity provider servers 120 may be one or more input-output devices (not shown), which illustratively include keyboards, displays or other types of input-output devices in any combination. Such input-output devices may be used, for example, to support one or more user interfaces to the managed hardware devices 102, user mobile device 130, and/or the identity provider server 120, as well as to support communications between the password-protected device 102, identity provider server 120 and other related systems and devices not explicitly shown.

The password-protected device 102, user computing devices 103, user mobile device 130, and/or identity provider servers 120 in the FIG. 1 embodiment may be implemented using at least one processing device (e.g., processor 106). Each such processing device generally includes at least one processor core and an associated memory (e.g., memory device 108) and implements one or more functional modules for controlling certain features of the respective device.

The processor 106 may include a microprocessor, a microcontroller, an application-specific integrated circuit (ASIC), a field-programmable gate array (FPGA) or other type of processing circuitry, as well as portions or combinations of such circuitry elements.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

Identity provider server 120 may provide authentication using any appropriate standard or proprietary technique. For instance, identity provider server 120 may provide the functionality of an Identity Provider (IDP), which is a service that manages and stores user identities, authentication credentials, and related attributes. When a user attempts to access a service connected to a single sign on (SSO) system, the IDP may authenticate the user by verifying user credentials. The user credentials may include a primary password, a secondary password (e.g., an OTP), a user ID, and/or the like. In the present example, the identity provider server 120 is configured to be integrated with an authenticator service. For instance, the authenticator service as integrated with the identity provider server 120 may allow the identity provider server 120 to verify an OTP, where the OTP may be entered by a user into the GUI 114 and transmitted by the password-protected device 102 to the identity provider server 120 over the network 104.

Once authenticated, the IDP may generate a security token or assertion, which serves as proof of the user's identity and authentication status. The identity provider server 120 may transmit the token to the password-protected device 102, over network 104, thereby allowing the password-protected device 102 to verify the user.

There are standards for implementing SSO, and they may involve the use of protocols such as Security Assertion Markup Language (SAML), OAuth, and OpenID Connect. SAML (Security Assertion Markup Language) is an XML-based standard for exchanging authentication and authorization data between parties, particularly between an identity provider and a service provider. OAuth (Open Authorization) is a framework that allows third-party applications to obtain limited access to a user's account without exposing the user's credentials. OAuth may be used for SSO scenarios where a user desires to grant access to their information on one site to another site. OpenID Connect (OIDC) is an identity layer built on top of OAuth 2.0. OIDC may provide a standardized way for clients to obtain identity information about users from an IDP. Both SAML and OIDC may be used for user authentication in SSO systems.

In one example use case, a user desires to access computing resources on password-protected device 102. For instance, the password-protected device 102 may be a computer, which the user uses for work. In another example, the password-protected device 102 may be a Web server having a desired web-based resource. In any event, the password-protected device 102 implements a user account for the user. The user must log into the account and be verified to receive access to the computing resource.

Continuing with the example, the password-protected device 102 executes security application 112, which provides GUI 114. GUI 114 may prompt the user for credentials. In an SSO embodiments, the user may enter the credentials into GUI 114, and the security application 112 may transmit those credentials to the identity provider server 120, which performs a verification of the user. For instance, the user may enter a login ID and a primary password. The security application 112 may transmit the credentials to identity provider server 120, which then uses those credentials to verify the user. Assuming that the primary password and login ID are valid, then the identity provider server 120 may further prompt the user for an OTP for multi-factor authentication.

In one example, the identity provider server may integrate an authenticator application. For instance, an example authenticator application may use a secret key and a common clock to generate a series of one-time passwords. Further, the user mobile device 130 may execute code to provide a security application that also integrates the authenticator application. When the security application was set up, the authenticator service would have provided the secret key to both the identity provider server 120 and to the security application on the user mobile device 130. Assuming that the identity provider server 120 and the user mobile device 130 have access to a common clock and have access to the shared secret key, the identity provider server 120 and the user mobile device 130 may generate the same series of one-time passwords.

Further in this example, each one-time password may be time-limited. For instance, OTPs may be limited to any appropriate time, such as 30 seconds, 60 seconds, 90 seconds, or the like. In an example in which OTPs are valid for 30 seconds, then both the identity provider server 120 and the security application on the user mobile device 130 may generate a new OTP every 30 seconds.

Figure 2:
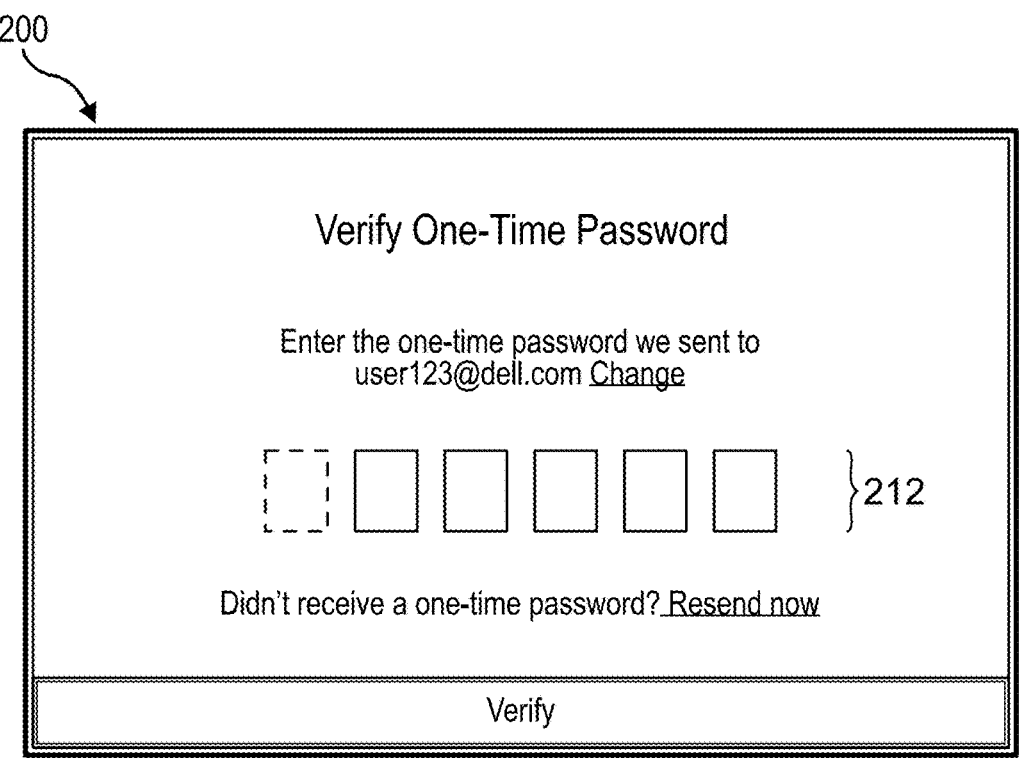
FIG. 2 is an illustration of an example screen for an example graphical user interface (GUI) for supporting transformed passwords, according to various embodiments.

As the user is prompted by GUI 114 to enter the OTP, the user may open the security application on mobile device 130. The security application on the mobile device 130 may display an alphanumeric text string (or simply a numeric text string) as the OTP. The user may enter the OTP into the GUI 114. An example of screen 200 and alphanumeric fields 212, which may be displayed on GUI 114, is shown in FIG. 2.

However, as noted above, the system of FIG. 1 allows for the use of password transforms. Assuming that the OTP provided by the security application is 982142, the user may enter a transformed version of that OTP. In other words, the user may not enter the OTP as-is but would already have a transform selected and associated with the account. The user would apply that transform to the OTP. Examples of transforms include:

Entering OTP in reverse order (for above example, 241289),

Entering OTP in reverse+append order (for above example, 982142241289),

Entering OTP where one digit appended at the end or it could be X digits as well (for above example, 9821420), Entering OTP where first and last digits are swapped (for above example, 282149).

Of course, those are examples, and there are more and different variations which are simple and convenient for the user to remember. The user enters the transformed OTP into the GUI 114, and the security application 112 may then perform a reverse of the transform on the transformed OTP. The reverse transform may undo the changes made by the user and thereby restore the OTP as it was received from the security application on the mobile device 130. In other words, the reverse transform may generate 982142 in the example above.

The security application transmits the restored OTP to the identity provider server 120 via network 104. The identity provider server 120, as noted above, also generates a series of OTPs based on the same clock and the same shared secret key. The identity provider server 120 may then compare the OTP (received from the security application 112) to its own generated reference OTP. If the OTPs do not match, then the identity provider server 120 may decline to verify the user, at least without further attempts. On the other hand, if the one OTP corresponds to the other OTP, then the identity provider server 120 may verify the user, generate a token indicating that the user has been verified, and transmit that token to the password-protected device 102. The password-protected device 102 may receive the token by the security application 112 and, in response, may allow access by the user.

Figure 3:
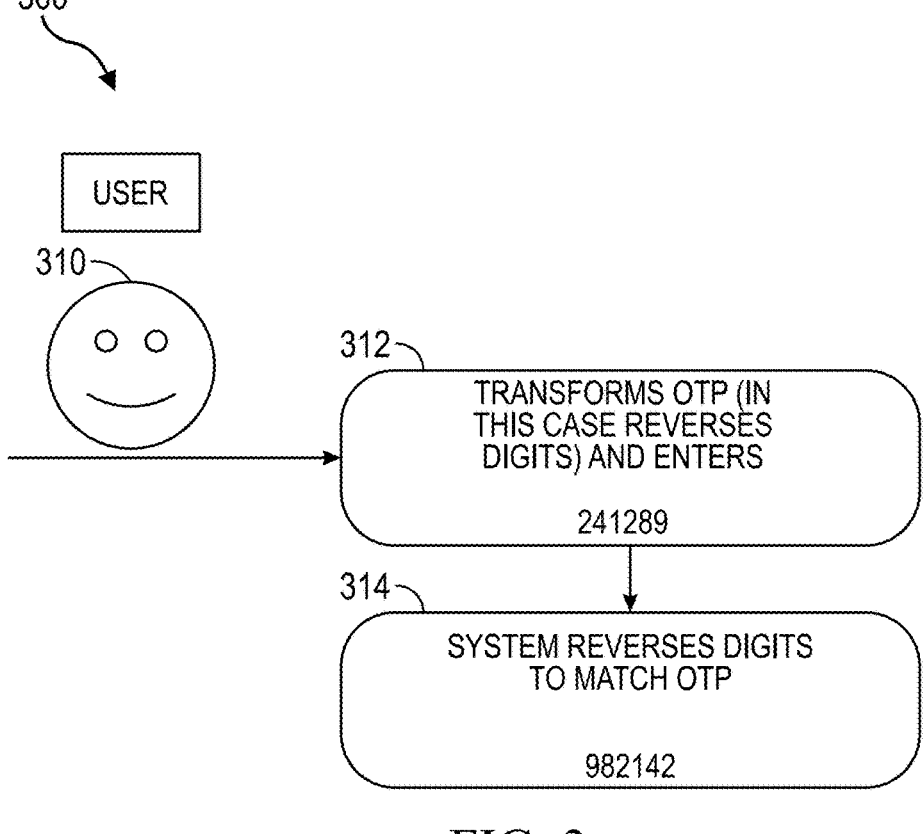
FIG. 3 is an illustration of an example process for supporting transformed passwords, according to various embodiments.

FIG. 3 is an illustration of a process 300, for facilitating the use of transformed passwords, according to one embodiment. In the example of FIG. 3, the user 310 may be a human user, and that human user may be associated with the mobile device 130 of FIG. 1. As noted above, the user 310 may open an authenticator application on mobile device 130, and the authenticator application may display an OTP, which in this example, is 982142. The transform is reverse order, so the user enters 241289 into the numeric fields 212 of FIG. 2 at action 312. Once the security application 112 receives the transformed OTP (241289), it performs the reverse transform at action 314 to restore the OTP (982142). The security application 112 may then transmit the restored OTP to the identity provider server 120 over network 104.

While the examples of FIGS. 1-3 use identity provider server 120, various embodiments may support transformed passwords without identity provider server 120. For instance, in other embodiments, authenticator functionality may be integrated into password-protected device 102. For instance, authenticator functionality may be integrated into security application 112. In such an example, security application 112 may share the secret key and the clock with the user mobile device 130 and, thus, may generate OTPs. Upon receiving the transformed OTP from the user 310, the security application 112 may then either verify the user or not verify the user based upon the transformed OTP. For instance, the security application may perform a reverse transform on the transformed OTP to generate the recovered OTP and then compare the recovered OTP to an OTP generated by the security application 112. In another example, the security application may perform the transform on its own generated OTP and compare the result to the transformed OTP. In either case, the comparison may be used to either allow or deny access to the computing resource.

Figure 4:
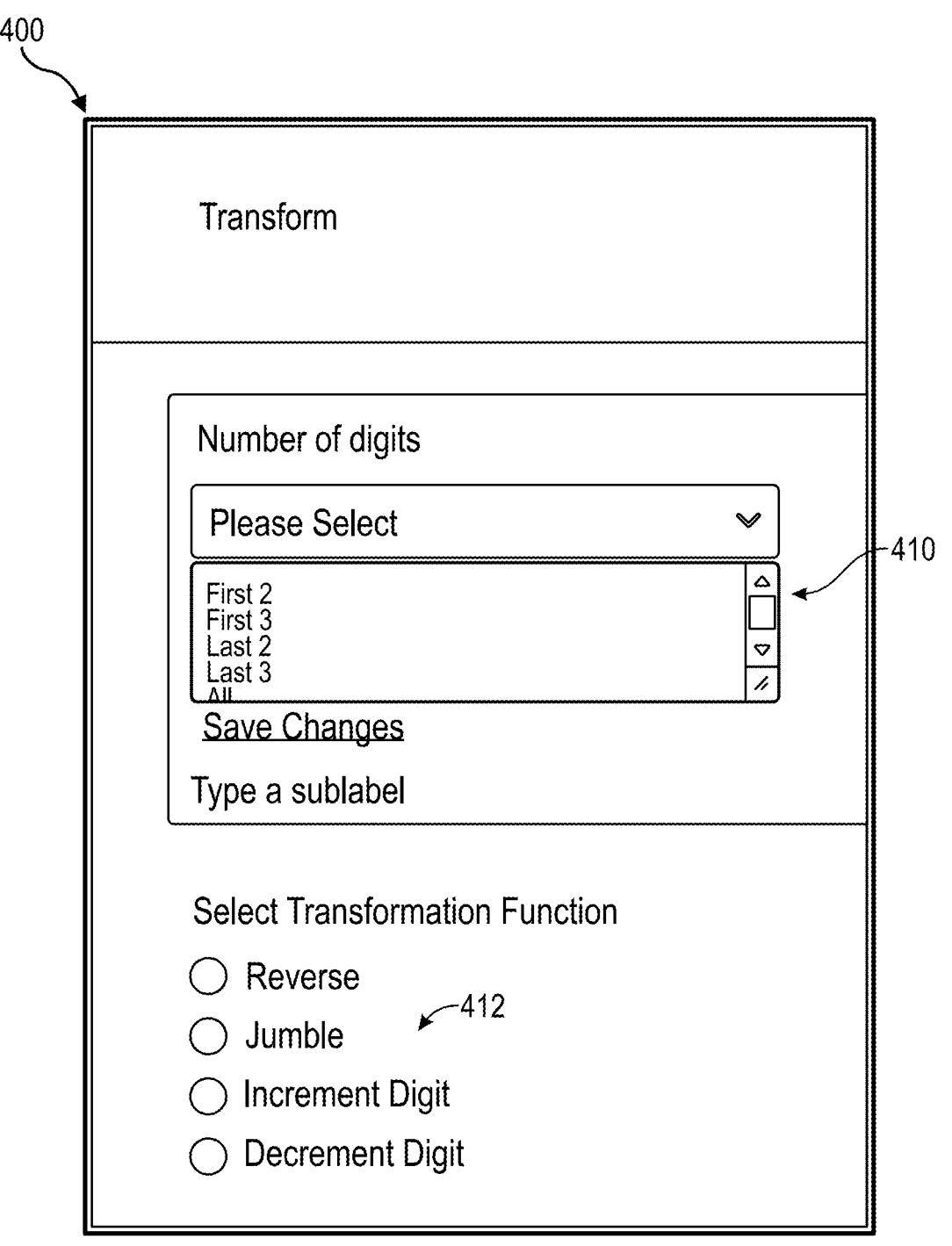
FIG. 4 is an illustration of an example screen for an example graphical user interface (GUI) for supporting transformed passwords, according to various embodiments.

FIG. 4 is an illustration of an example screen 400, which may be displayed on GUI 114 of FIG. 1, according to various embodiments. In this example, screen 400 allows a user to select a transform, from a multitude of other transforms, for use in a transformed password technique. For instance, a user may choose a transform to apply to a password, such as in the examples of FIGS. 1-3.

In the present example, a user may select which alphanumeric characters to affect in the transform using tool 410. For instance, the user may choose the first two characters, the first three characters, the last two characters, the last three characters, or all of the characters. Further, the user may choose an option for a function to apply for those chosen characters using tool 412. For instance, the user may choose to reverse those characters, to change an order of the characters that is different from reversing (e.g., jumbling), incrementing a character (e.g., changing an 8 to a 9 or changing the character A to the character B), decrementing a character (e.g., the opposite of incrementing). The examples of FIG. 4 are not exhaustive, as any other appropriate transformations on any appropriate characters may be used in various implementations. For instance, although not shown in FIG. 4, appending a string to an end of a password or to the beginning of a password may also be used.

Table A is provided below, and it illustrates several examples of a user applying a chosen transform to a password. The first column identifies a user ID; the second column identifies a selected transform; the third column identifies a reverse transform; which a system may use to restore the password; the fourth column is a brief description of how the user applies the transform.

TABLE A

| User | Selected transform | System applies reverse transform | Notes |
|---|---|---|---|
| john__doe | transform__otp (append(1234)) | reverse__transform__otp (remove__from__end (1234)) | john__doe is a user accessing his account. He receives 3678 as OTP and he transforms it manually as "36781234" |
| mike__d for DataDomain | transform__otp (reverse( )) | reverse__transform__otp (reverse( )) | mike__d is a user accessing his account for DD. He receives 3678 as OTP and he transforms it manually as "8763" |
| mike__d for PPDM | transform__otp (append(1111)) | reverse__transform__otp (remove__from__end (1111)) | mike__d is a user accessing his account for PPDM. He receives 3678 as OTP and he transforms it manually as "36781111". Note that mike__d uses the same transform for different accounts. |
| sampada__b | transform__otp (jumble(digit1, digit2)) | reverse__transform__otp (jumble(digit2, digit1)) | sampada__b is a user accessing her account. She receives 3678 as OTP and she transforms it manually as "6378" |
| Abhidnya__j | transform__otp (reverse__digit (digit1, digit4)) | reverse__transform__otp (reverse__digit(digit4, digit1)) | abhidnya__j is a user accessing her account. She receives 3678 as OTP and she transforms it manually as "8673" |
| another__user1 | transform__otp (reverse( )) | reverse__transform__otp (reverse( )) | another__user1 is a user accessing her account. She receives 3456 as OTP and she transforms it manually as "6543" |
| another__user2 | transform__otp (jumble(digit1, digit4)) | reverse__transform__otp | another__user2 is a user accessing her account. She receives 3456 as OTP and she transforms it manually as "6453" |

The scope of implementations is not limited to a static quantity of choices for transforms. In another example, a user may define a transform for use without selecting from a list of choices. In one such example, a user trains the system to implement a transform by providing one or more examples of the transformed OTP. For instance, during initial setup, the system may present an OTP as "1234" and user may respond with "4321". The system and user may repeat this process an appropriate number of times, such as 3 or 5 times, so that the system learns that the transform is to reverse the string. The same can be done with various techniques to transpose, increment or decrement, append, or the like.

The user may select a transform when setting up an account, when resetting an account, or at any other appropriate time. Once the user selects a transform, the system (e.g., password-protected device 102 or identity provider server 120) may store in its memory (e.g., memory device 108) an identification of the transform. The system may then access the transform identification in the memory when it receives a transformed password from the user when the user attempts to access computing resources in the future.

As noted above, the user account may be protected by a mechanism employed by either the password-protected device 102 or the identity provider server 120 in which a threshold number of unsuccessful login attempts may lead to lockout of the user account. For instance, the threshold may be set at five attempts, ten attempts, or another appropriate quantity of attempts. Once the user is locked out the user may have a chance to reset the account, such as by requesting a link sent to a known safe address (e.g., a phone number, a messaging address, or email address).

Further, the user may reset the password transformation at an appropriate time. For instance, the user may reset the password transformation periodically, at will, at a time at which the user suspects or knows the transform may be compromised by malicious user, or the like. The user may login to the account according to the set technique (including entering a transformed password), make any changes to the password, the transform, or other user security information, and save those changes. The system (e.g., password-protected device 102 or identity provider server 120) may store those changes in its memory and apply them during future accesses.

FIG. 5 is an illustration of an example method 500, for administering password transformation and authentication, according to various embodiments. The various actions 502-512 of method 500 may be performed by a device that sets up the password transformation and receives password input from a user during an attempt to access resources. For instance, various actions 502-512 may be performed by, e.g., password-protected device 102 or identity provider server 120 of FIG. 1 in some examples.

Actions 502-506 may be performed during account set up, password reset, or other appropriate time. Actions 508-512 may be performed during a user login, such as when the user desires to access computing resources from the system.

At action 502, the system prompts the user to select a transform. In one example, the system may provide a GUI (e.g., GUI 114), which displays a screen, such as screen 400 of FIG. 4. Action 502 may be performed during account set up, during account password or transform reset, or at any other appropriate time.

At action 504, the system receives the indication of the transform from the user. For instance, the user may employ a keyboard, mouse, or other interface device to enter a selection, such as is shown in FIG. 4. The user may use tools, such as tools 410 and 412 or other appropriate tools to select a desired transform.

At action 506, the system stores the indication of the transform to memory. For instance, the system may store the information received, via the GUI, to a memory. The system may access the indication of the transform at an appropriate time by accessing the address in memory where the indication of the transform is stored.

At action 508, the system may prompt the user for a password. The password may be a primary password or a secondary password. In the example of FIG. 2, the system prompts the user to enter an OTP, which is a type of secondary password. In response to the prompt, the user may enter an alphanumeric string (or simply a numeric string) in the fields 212 and then press a button, such as "verify" in FIG. 2.

At action 510, the system receives the password from the user. For instance, the user may have used a screen, such as screen 200 of FIG. 2 to enter a password that has been transformed.

At action 512, the system verifies the user based on the password and transform. In one example, the system that receives the transformed password may be different than a system that compares the password to a reference password. For instance, the password-protected system 102 may receive the password and then transmit that password to the identity provider server 120 (FIG. 1). In such an instance, the password-protected device 102 may perform a reverse of the transform to restore the password. For instance, if the transform is a reverse order transform, then the reverse of the transform may restore the order of the characters in the password. Any appropriate reverse transform may be performed. In this example, the system storing an indication of the transform is different from the system that verifies the password. An advantage of such a system is that it keeps the transform itself safe from a malicious user who may perform a man in the middle attack between password-protected device 102 and identity provider server 120. Such a system may also protect the transform should identity provider server 120 become compromised. Furthermore, in this example, the identity provider server 120 may verify the user by matching the received password to a reference password and then transmitting a verification token to the password-protected device 102. The password-protected device 102 may verify the user by receiving the verification token.

In another example, the system that receives a transformed password may be the same as a system that compares the password to a reference password. For instance, the password-protected device 102 may receive the transformed password and then verify the user without further interaction with another device, such as the identity provider server 120. In this example, the password-protected device 102 may receive the transformed password, perform a reverse transform and then compare the result to a reference password. In another example, the password-protected device 102 may perform the transform itself on the reference password and compare the result to the transformed password. If the system determines that the transformed password corresponds to the reference password, then the system may verify the user. On the other hand, should the system determine that the transformed password does not correspond to the reference password, then the system may refuse to verify the user (at least without further attempts to verify).

Although not shown in FIG. 5, the method 500 may further include providing the user with access to a computing resource. The computing resource, as described above, may include access to the password-protected device 102 generally, providing appropriate access according to an access level (e.g., user level or administrator level), providing access to a website, and/or the like.

FIG. 6 is an illustration of example method 600, for setting up and using a transformed password, according to various embodiments. In one example, the method 600 may be performed by a user, such as a human user or a computerized user, as it interacts with a security application. For instance, the user may interact with security application 114, the security application on user mobile device 130, and/or a security application on identity provider server 120 (FIG. 1).

Actions 602-604 may be performed during account set up, password reset, or at other appropriate time. Actions 606-610 may be performed as the user attempts to access the account and an associated computing resource.

At action 602, the user selects the transform, such as during account set up, password reset, or the like. For instance, the user may interact with a screen, such as screen 400 of FIG. 4, which is displayed on a GUI, such as GUI 114 of FIG. 1. The user may employ interface devices, such as a keyboard and mouse or other appropriate device to select an appropriate transform.

At action 604, the user may confirm the transform. In one example, after having selected the transform, the user may be presented with a challenge. For instance, the system may use GUI 114 to present the user with a dummy password for the user to transform and then enter. Should the user transform the dummy password appropriately, then the system may store the transform identification to its memory. However, should the user incorrectly transform the dummy password, the system may flag the error to the user and request that the user re-try or re-select a new transform. Once the user has confirmed the transform at action 604, the system may store the transform identification.

At action 606, the user receives a prompt to enter the password. In this example, the user either memorizes the transform or accesses the transform from some kind of storage, such as a password keeper or having written the transform on paper. An example of a prompt to enter the password includes the screen 200 of FIG. 2.

At action 608, the user may apply the transform to the password to generate a transformed password. In one example, the user may apply the transform in the user's mind, apply the transform to the password on a piece of paper and then transfer the transformed password to the GUI, or any appropriate manner. In one example, the user may save the transform to a password keeper, which automatically applies the transform to the password when the user enters the password into the GUI. In any event, the user performs the transform either manually or automatically through a password keeper. Examples of transforms are given above, such as reversing an order of the characters, appending characters, transposing characters, incrementing or decrementing characters, or the like.

At action 610, the user enters the transformed password into the system user interface. For instance, as noted above, the user may enter the transform password manually or may use a password keeper to enter the transformed password automatically. In any event, the password that is entered into the GUI has been transformed, so it is different than the password as the password was either assigned or chosen. Examples are given above with respect to Table A.

Should the user correctly enter the transformed password, then it is expected that the system, which executes method 500, will provide the user with access to the computing resource. On the other hand, should the user incorrectly enter the transformed password, then it is expected that the system may deny access to the computing resource. The user may be prompted to re-try to verify using the password.

The examples of FIGS. 5-6 may be performed on a primary password or a secondary password. An advantage of some embodiments is that they may provide an extra level of security to the computing resource above that provided by the password(s). Specifically, the identity of the transform is generally expected to be known only to the user. Furthermore, the identity of the transform is expected to be simple for the user to use but difficult for a malicious user to break. Specifically, password systems may protect themselves by locking out an account after a threshold number of unsuccessful login attempts, thereby preventing a malicious user from using brute force to acquire the transform. Also, OTPs may be valid for only a short time period, e.g., 30 seconds, and that time period may generally be too short for a malicious user to perform a number of attempts to correctly acquire the transform. Together, a threshold number of unsuccessful login attempts and a defined time period for validity of a password may provide additional security to a computing resource.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

Although the invention(s) is/are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
   providing a user interface (UI), the UI including a first prompt for a user to select from a plurality of transforms;
   receiving an indication of a first transform, of the plurality of transforms, from the user;
   presenting the user with a first password, via the UI;
   receiving a transformed first password from the user, via the UI;
   confirming the first transform in response to the user entering the transformed first password in accordance with the first transform;
   providing a second prompt for a user to enter a one-time password (OTP);
   receiving the OTP via a user input to the UI, wherein the OTP comprises a quantity of alphanumeric characters;

performing the first transform on the OTP, thereby generating a transformed OTP;

comparing the transformed OTP to a reference OTP; and either verifying the user or not verifying the user based on results of the comparing.

2. The method of claim 1, wherein the method comprises verifying the user based on determining that the transformed OTP corresponds to the reference OTP.

3. The method of claim 1, wherein the method comprises not verifying the user based on determining that the transformed OTP is different than the reference OTP.

4. The method of claim 3, further comprising:

locking an account of the user in response to not verifying the user.

5. The method of claim 3, further comprising:

prompting the user to reset the account in response to locking the account.

6. The method of claim 1, wherein the first transform is a reverse of a second transform applied to the OTP by the user in the UI.

7. The method of claim 1, further comprising:

generating the reference OTP from a secret key.

8. The method of claim 1, wherein the prompt for the user to enter the OTP is performed in response to verifying a primary password of the user.

9. An Information Handling System (IHS), comprising:

a processor; and a memory coupled to the processor, the memory having program instructions stored thereon that, upon execution by the processor, cause the processor to:

provide a user interface (UI), the UI including a first prompt for a user to select from a plurality of transforms;

receive an indication of a first transform, of the plurality of transforms, from the user;

present the user with a first password, via the UI;

receive a transformed first password from the user, via the UI;

confirm the first transform in response to the user entering the transformed first password in accordance with the first transform;

provide a second prompt for a user to enter a one-time password (OTP);

receive the OTP via a user input to the UI, wherein the OTP comprises a quantity of alphanumeric characters;

perform a first transform on a reference OTP, thereby generating a transformed reference OTP;

compare the transformed reference OTP to the OTP; and either verify the user or not verify the user based on results of the comparing.

10. The IHS of claim 9, wherein the program instructions to cause the processor to either verify the user or not verify the user comprises program instructions to cause the processor to verify the user based on determining that the transformed reference OTP corresponds to the OTP.

11. The IHS of claim 9, wherein the program instructions to cause the processor to either verify the user or not verify the user comprises program instructions to cause the processor to not verify the user based on determining that the transformed reference OTP is different than the OTP.

12. The IHS of claim 9, further comprising program instructions to cause the processor to generate the reference OTP based on a secret key shared with a device of the user.

13. The IHS of claim 9, further comprising program instructions to cause the processor to verify the user via a primary password prior to prompting for the user to enter the OTP.

14. The IHS of claim 9, further comprising program instructions to cause the processor to lock an account of the user in response to not verifying the user.

15. A computer-readable, non-transitory memory device having program instructions stored thereon that, upon execution by a processor of an Information Handling System (IHS), cause the processor to:

prompt a user to indicate a first transform, selected from a plurality of transforms, for use with account verification;

present the user with a first password, via the UI;

receive a transformed first password from the user, via the UI;

confirming the first transform in response to the user entering the transformed first password in accordance with the first transform;

store, in memory, an indication of the first transform;

prompt the user to enter a second password;

receive the second password;

access, from the memory, the indication of the first transform;

determine that the user has entered the second password according to the first transform; and permit the user to access the IHS.

16. The computer-readable, non-transitory memory device of claim 15, wherein the program instructions to receive the second password comprises program instructions to receive a primary password, and wherein the program instructions to permit the user to access the IHS comprises program instructions to further verify the user according to a multi-factor authentication protocol.

17. The computer-readable, non-transitory memory device of claim 16, wherein the program instructions to further verify the user according to a multi-factor authentication protocol comprises program instructions to verify the user according to a one-time password (OTP), which is different from the second password.

18. The computer-readable, non-transitory memory device of claim 15, wherein the program instructions to receive the second password comprises program instructions to receive a one-time password (OTP), and wherein the program instructions to permit the user to access the IHS comprises program instructions to further verify the user according to a primary password, which is different from the OTP.

19. The computer-readable, non-transitory memory device of claim 15, wherein the program instructions to determine that the user has entered the second password according to the first transform comprises program instructions to apply a reverse of the first transform to the password, thereby generating a result, and program instructions to compare the result to a reference password.

20. The computer-readable, non-transitory memory device of claim 15, wherein the program instructions to determine that the user has entered the second password according to the first transform comprises program instructions to apply the first transform to a reference password, thereby generating a result, and program instructions to compare the result to the second password.

* * * * *